(12) United States Patent
Godinez (10) Patent No.: US 9,918,575 B2
(45) Date of Patent: *Mar. 20, 2018

(54) BEVERAGE CONTAINER COASTER

(71) Applicant: Ruben Godinez, Wilmington, CA (US)

(72) Inventor: Ruben Godinez, Wilmington, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/656,430

(22) Filed: Jul. 21, 2017

(65) Prior Publication Data

US 2017/0318996 A1 Nov. 9, 2017

Related U.S. Application Data

(63) Continuation-in-part of application No. 14/752,633, filed on Jun. 26, 2015, now Pat. No. 9,743,787, which is a continuation-in-part of application No. 29/528,234, filed on May 27, 2015, now Pat. No. Des. 779,286.

(60) Provisional application No. 62/162,672, filed on May 16, 2015.

(51) Int. Cl.
*A47G 23/03* (2006.01)
*B25J 9/00* (2006.01)

(52) U.S. Cl.
CPC ........ *A47G 23/0309* (2013.01); *B25J 9/0003* (2013.01); *B25J 9/0009* (2013.01); *A47G 2200/143* (2013.01)

(58) Field of Classification Search
CPC ........... A47G 23/0309; A47G 2200/143; B25J 9/0003; B25J 9/0009

USPC .............. 362/101, 96, 234, 253; 248/346.11, 248/346.01

See application file for complete search history.

(56) References Cited

U.S. PATENT DOCUMENTS

| | | | | |
|---|---|---|---|---|
| 332,201 A * | 12/1885 | Hurley | ................... | D06F 79/02 248/117.2 |
| 1,187,899 A * | 6/1916 | Gardam | ................. | A47G 19/26 220/23.86 |
| 2,583,951 A * | 1/1952 | Kliegel | .................... | A47G 19/04 215/10 |
| 3,363,869 A * | 1/1968 | Blundell | ................ | A47G 23/03 215/394 |
| 3,598,271 A * | 8/1971 | Holley | ............... | B65D 21/0219 206/509 |
| 4,858,572 A * | 8/1989 | Shirai | ................... | F01L 1/3442 123/90.12 |
| 4,953,823 A * | 9/1990 | Sheaffer | ............... | A47G 23/032 215/394 |
| 6,863,415 B2 * | 3/2005 | Lu | ....................... | A47G 23/0309 362/101 |
| 7,163,308 B2 * | 1/2007 | Ferrari | .............. | A41D 19/0157 2/159 |

(Continued)

*Primary Examiner* — Laura Tso
(74) *Attorney, Agent, or Firm* — David M. Kleiman (57) ABSTRACT

A beverage container coaster with a coaster housing having a substantially horizontal palm portion that contains a beverage area for supporting a beverage container in a substantially level fashion. At least one finger extension is attached to said coaster housing. The finger extension may be removably attachable to the beverage container coaster housing and may also be rotatably attached and moveable and pliable for changing their position and shape. Sound and/or light generators may also be incorporated into the beverage container coaster and used under the control of an electronic controller contained within the coaster housing.

19 Claims, 10 Drawing Sheets

(56) References Cited

U.S. PATENT DOCUMENTS

| | | | | |
|---|---|---|---|---|
| 7,479,054 B2* | 1/2009 | Wittenberg | ............... | A63H 3/04 |
| | | | | 446/373 |
| 8,087,630 B1* | 1/2012 | Matthews | ................. | A45F 3/44 |
| | | | | 248/156 |
| 9,199,765 B1* | 12/2015 | Lekic | ................. | A47G 23/0316 |
| 2004/0238711 A1* | 12/2004 | Ngo | ...................... | A47B 91/12 |
| | | | | 248/346.11 |
| 2005/0073832 A1* | 4/2005 | Shilton | .............. | A47G 23/0216 |
| | | | | 362/101 |
| 2005/0200455 A1* | 9/2005 | Veni, III | ................ | G06Q 50/12 |
| | | | | 340/7.55 |
| 2007/0040652 A1* | 2/2007 | Quatro | ................... | G06Q 50/12 |
| | | | | 340/7.55 |
| 2009/0057248 A1* | 3/2009 | Vishnevsky | ....... | B65D 21/0224 |
| | | | | 211/74 |
| 2010/0133285 A1* | 6/2010 | Schepen | ............ | B65D 21/0233 |
| | | | | 220/781 |
| 2011/0174658 A1* | 7/2011 | Otsubo | .............. | B65D 21/0219 |
| | | | | 206/508 |
| 2011/0215216 A1* | 9/2011 | Dimella | ................ | A47G 23/03 |
| | | | | 248/346.11 |

* cited by examiner

BEVERAGE CONTAINER COASTER

This application is a continuation-in-part of U.S. utility patent application Ser. No. 14/752,633 (hereinafter the "'633 application") filed on Jun. 26, 2015 for which the benefit of priority is claimed and the contents of which are hereby incorporated by reference, the '633 application being a continuation-in-part of U.S. non-provisional design patent application 29/528,234 filed on May 27, 2015 and issued now as U.S. patent D779,286 for which the benefit of priority is also claimed and the contents of which are hereby incorporated by reference, and the '633 application also claiming the benefit of priority to U.S. provisional patent application 62/162,672 filed on May 16, 2015 for which the benefit of priority is also claimed here and the contents of which are hereby incorporated by reference.

BACKGROUND OF THE INVENTION

The present invention is for a type of beverage container coaster that is placed between a beverage container and a surface such as a wood table or countertops to protect the surface from moisture and heat transfer by the beverage container.

BRIEF SUMMARY OF THE INVENTION

The present invention provides a novel and non-obvious type of beverage container coaster that has functions designed to help enhance the functionality and visual appeal of a beverage container coaster that is used to protect a surface. Traditional beverage container coasters are plain, flat and lackluster offering no protection against a beverage container tipping or sliding off the beverage container coaster. The beverage container coaster of the present invention includes a substantially horizontal palm portion with a lower outer surface and an upper outer surface that contains a beverage area for supporting a beverage container in a substantially level fashion. In addition the beverage container coaster of the present invention also includes the novel and non-obvious feature of at least one finger that is attached to and extends from an edge of the palm portion of the coaster housing. The finger is configured such that a finger tip of such at least one finger is fixed, and/or may be moved to and from, an elevated position with a vertical height that is greater than the vertical height of the beverage area of the palm portion. In an exemplary embodiment it is contemplated that the beverage container coaster would have five fingers (including a "thumb" finger) that extend outward from the horizontal palm portion of the coaster housing, and which are constructed so as to be manually moveable between an extended horizontal position (for convenient stacking and storage of the beverage container coasters) into various elevated positions and forms (e.g. raised and partly curled towards the beverage area). Of course, such an embodiment is merely exemplary, with the present invention being capable of being implemented in many different embodiments (i.e. different numbers and shapes or styles of fingers (e.g. a five finger "zombie" hand with mangled crooked and discolored fingers, or a three finger "alien" hand with long luminescent fingers, or a five fingered butler colored gloved hand, etc. . . . ).

In one contemplated embodiment one or more fingers of the beverage container coaster may be removably attachable to the coaster housing, either individually or as modules comprising multiple fingers. Being able to remove and reattach fingers can facilitate the storage of the beverage container coaster when it is not in use, allow for replacement of damaged fingers, and it can also facilitate the use of different numbers and/or types of fingers on the beverage container coaster. It is contemplated that the connection established between a removably attachable finger and the coaster housing may be mechanical and/or electrical such that the removably attachable fingers can in some embodiments contain electrical components that would receive power from a power supply associated with the coaster housing (e.g. internal batteries). In a preferred exemplary embodiment a removably attachable finger is attached to the coaster housing with a ball and socket joint mechanism that facilitates the finger being rotatable and moveable relative to the coaster housing when attached.

It is further contemplated that the beverage container coaster will have embodiments that integrate into the beverage container coaster sound and/or light generators, which in some contemplated embodiments may be under the control of a controller. The outer surfaces of the beverage container coaster may also bear various images, patterns, designs, insignia, symbols, text, messages, slogans or logos. Accordingly, the beverage container coaster invention described and claimed herein performs the useful functions of helping to prevent beverage container spills with one or more elevated fingers, protects surfaces from moisture and heat transfer by a beverage container, and can provide entertainment and decoration that is a great addition to any social occasion, and may be used to help establish a particular theme (e.g. Halloween, Christmas, Memorial Day, independence Day, Birthdays, etc. . . . ).

DETAILED DESCRIPTION OF THE INVENTION

A detailed description is now provided for an illustrated exemplary embodiment of the present beverage container coaster invention. Referring to FIGS. 1-8 an exemplary embodiment of a beverage container coaster 10 supporting a beverage container 20 is shown. In the illustrated embodiment of FIGS. 1-8 the beverage container coaster 10 is in the form of a five finger (including the "thumb" finger) hand. However, it should be noted that the present invention is not limited to the particular exemplary form of a hand as shown, and could take any shape or form that performs the functions of the described and illustrated beverage container coaster without departing from the spirit or scope of the present invention.

Beverage container coaster 10 has a coaster housing 40 with at least one finger extension 30 that extends from an edge 41 of palm portion 42. Palm portion 42 has an outer lower surface 44 and a substantially horizontal upper outer surface 46. Upper outer surface 46 contains a beverage area 48 for supporting a beverage container 20 in a substantially level fashion. In a preferred embodiment beverage area 48 is co-planar with the other portions of upper outer surface 46 of palm portion 42. However, in other embodiments beverage area 48 may be recessed below, or elevated above, the other portions of upper outer surface 46. The beverage area 48 of coaster housing 40 is preferably comprised of an appropriate material to prevent moisture or heat transfer between a beverage container 20 placed on beverage area 48 and any interior components of housing 40 or any surface upon which beverage container coaster 10 is resting or in contact with. In some contemplated embodiments beverage area 48 may be comprised of a first material 51 that is different from a second material 53 of coaster housing 40 that is adjacent to or surrounding beverage area 48. By way of example and not limitation beverage area 48 may be comprised of a first non-slip material (e.g. cork) to prevent movement of the beverage container 20 and possible spillage of the beverage, while surrounding areas of palm portion 42 are comprised of a second material (e.g. hard plastic). An example of materials that some or all of housing 40, including beverage area 48, may be comprised of include but are not limited to elastomers, plastic polymers (such as polyvinyl chloride (PVC)), rubber, or cork.

Figure 21:
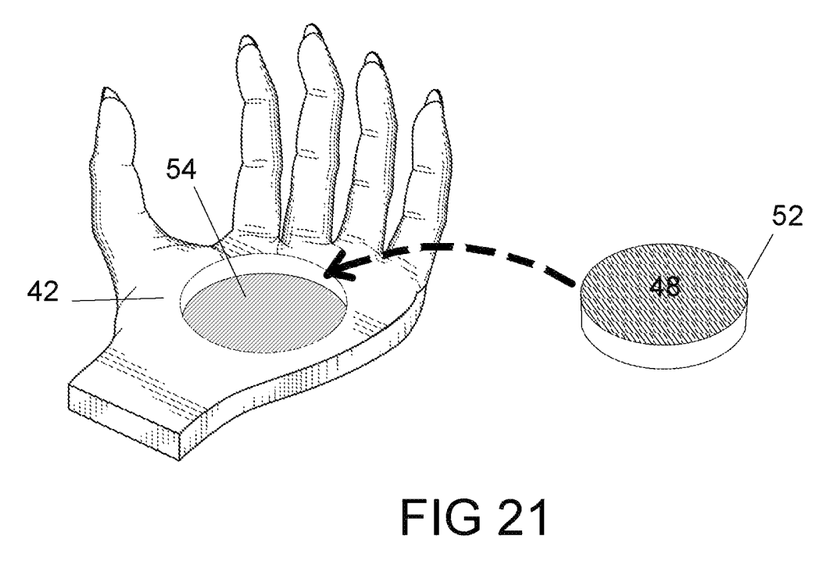
FIG. 21 is a right front side perspective view of a beverage container coaster with a beverage module receptacle for receiving the shown beverage area module into the coaster housing.

It is also contemplated that beverage area 48 may be a removable beverage area module 52 that can be inserted and removed from a beverage module receptacle 54 in coaster housing 40. This can facilitate replacement or exchange of a beverage area that becomes damaged or needs cleaning, or can facilitate the use of beverage areas that have different designs, features or characteristics. By way of example, and not limitation a first beverage area module may be comprised of a solid material like cork, while a second beverage area module could be comprised of a translucent plastic housing containing an inner generator or light and/or sound, perhaps with a pressure sensor activation means of the inner generator for when a beverage is placed on the beverage area. Such second beverage area module may contain its own power source and/or controller for the inner generator, or alternatively may have a connector for connecting to a power and/or data bus that is operatively connected to a power source and/or controller located elsewhere in coaster housing 40 (e.g. in a wrist portion).

The present invention contemplates that when beverage container coaster 10 is used with a beverage container 20 that at least one finger extension 30 extending from an edge 41 of palm portion 42 will be in an elevated position such that finger tip 34 is at a height greater than the height of the beverage area 48 surface upon which a beverage container 20 may be placed. In the illustrated exemplary embodiment of FIGS. 1-8 coaster housing 40 has a plurality of elevated finger extensions 30 that extend from an edge 41 of palm portion 42. It should be noted that the shape of coaster housing 40, including the number and shape of finger extensions 30, shown is merely an exemplary embodiment of the present invention. Other shapes of coaster housing 40, including having different numbers and/or shapes of finger extensions 30 that extend from one or more edges 41 of palm portion 42, may be used without departing from the present invention. By way of example, and not limitation, an alternate embodiment of a hand shaped beverage container coaster is contemplated where a "thumb" finger extension that extends from an edge would be 50% or more shorter in length than other finger extensions. In another possible embodiment a thumb finger extensions may be absent from the beverage container coaster altogether.

Figure 1:
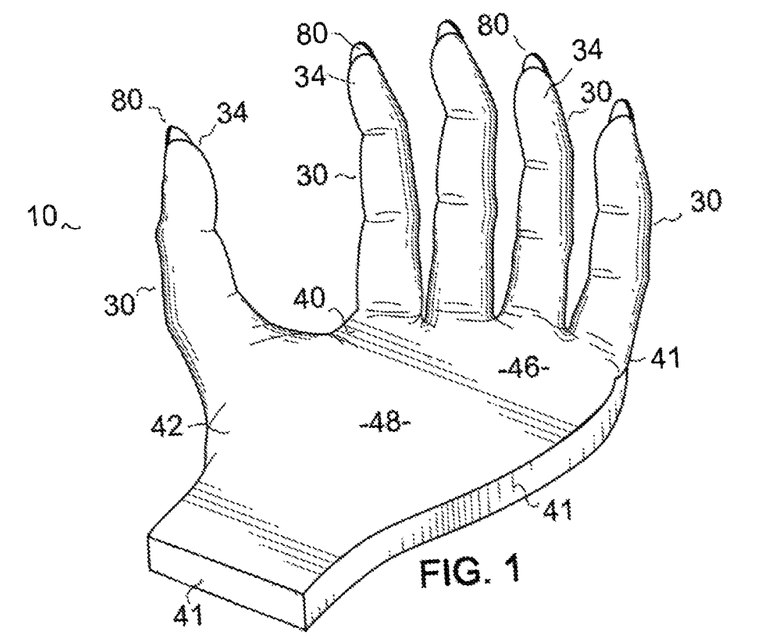
FIG. 1 is a right front side perspective view of a first exemplary embodiment of the beverage container coaster in accordance with the present invention.
Figure 2:
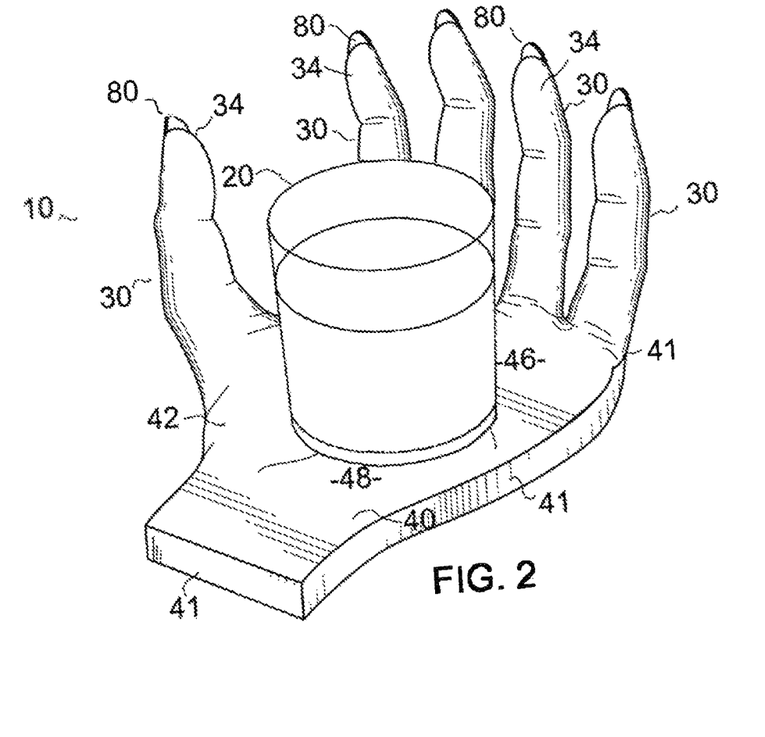
FIG. 2 is a right front side perspective view of the beverage container coaster shown in FIG. 1 supporting a beverage container on the beverage area of the palm portion.
Figure 3:
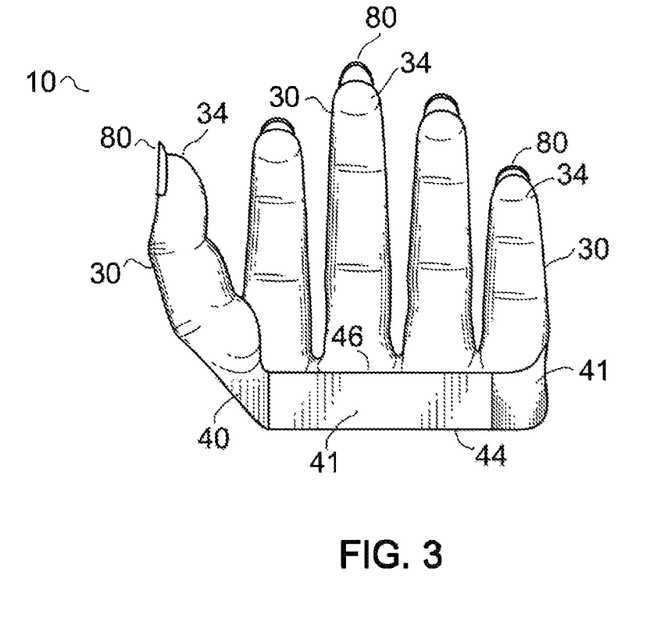
FIG. 3 is a front side view of the beverage container coaster of FIG. 1.
Figure 4:
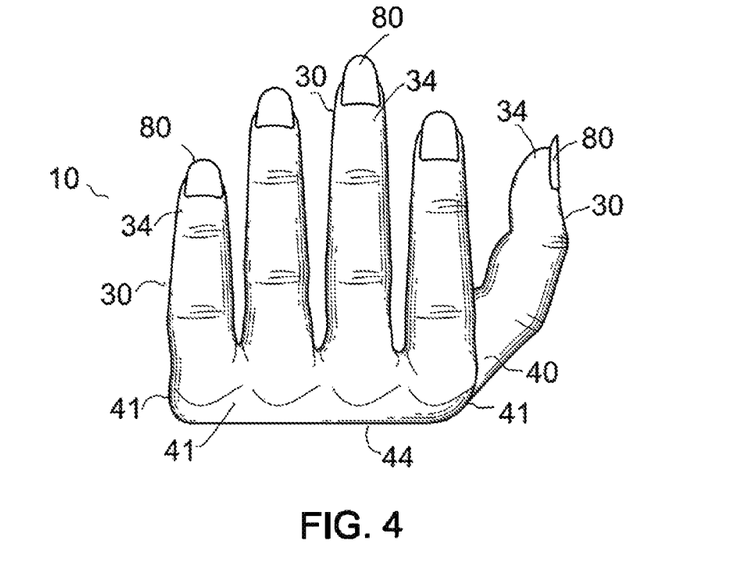
FIG. 4 is a rear side view of the beverage container coaster of FIG. 1.
Figure 5:
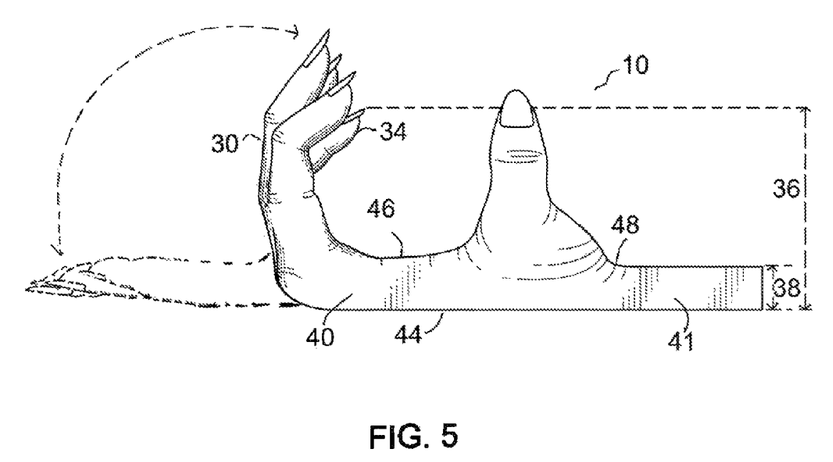
FIG. 5 is a left side view of the beverage container coaster of FIG. 1 that shows an exemplary range of motion for the moveable fingers in dashed line.
Figure 6:
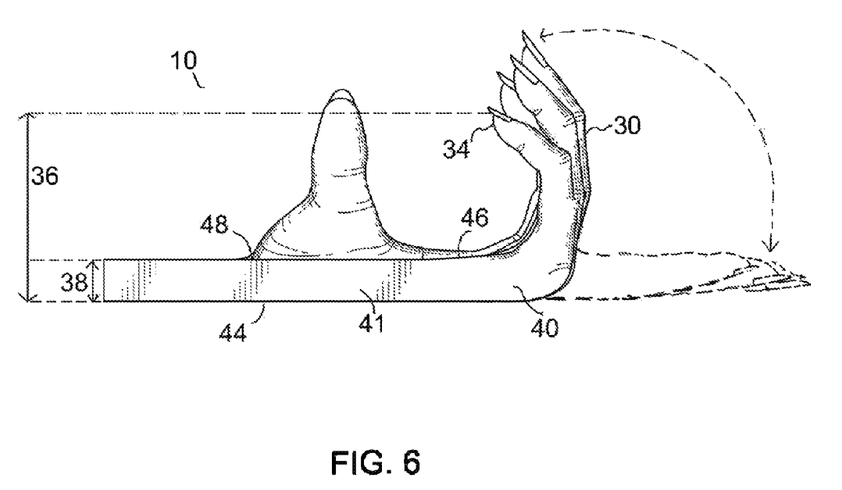
FIG. 6 is a right side view of the beverage container coaster of FIG. 1 that shows an exemplary range of motion for the moveable fingers in dashed line.
Figures 7, 8:
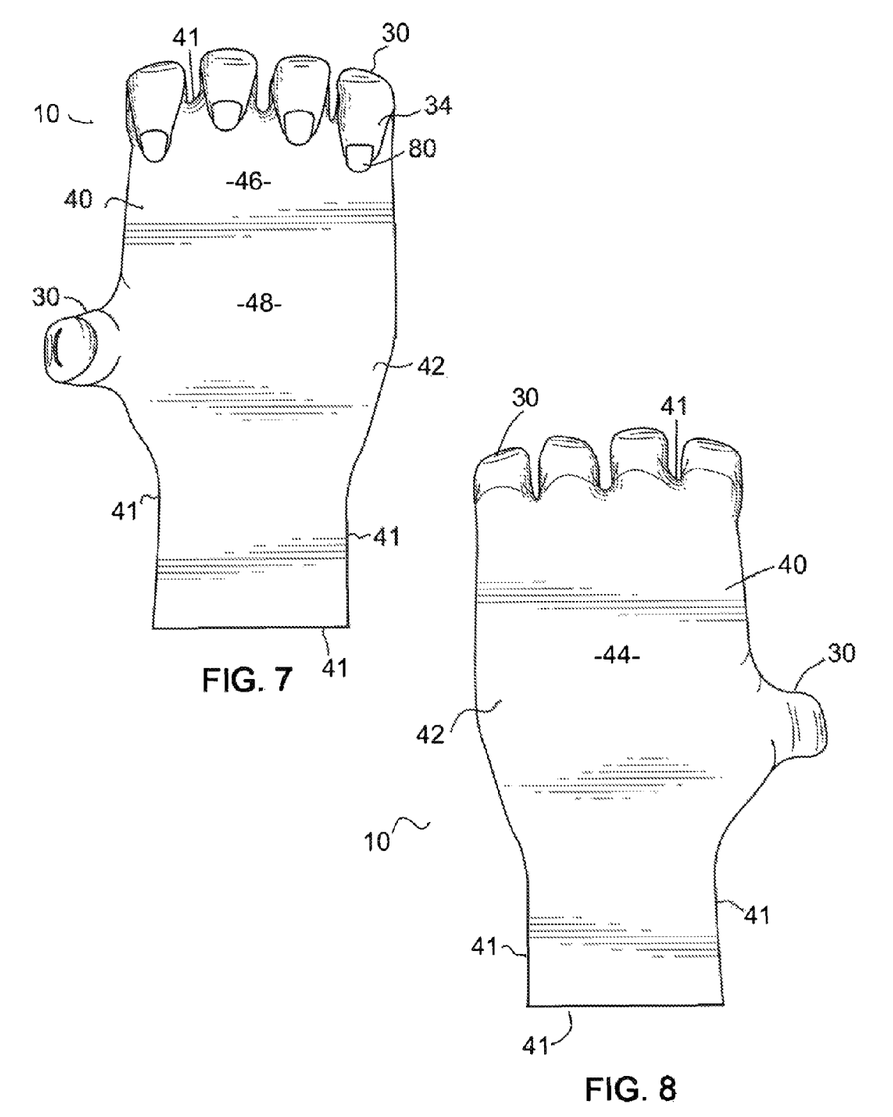
FIG. 7 is a top side view of the beverage container coaster of FIG. 1.
FIG. 8 is a bottom side view of the beverage container coaster of FIG. 1.

Referring to FIGS. 5-6 it is shown how when configured for use with a beverage container 20 the finger tips 34 of finger extensions 30 of coaster housing 40 are elevated at a finger tip height 36 that is greater than the beverage area height 38. Any elevation of finger tip 34 of any finger extension 30 to a height above the beverage area surface height 38 will help prevent a beverage container 20 placed on beverage area 48 from sliding off of beverage container coaster 10 and possibly spilling or damaging the surface upon which beverage container coaster 10 is placed.

In some embodiments some or all of finger extensions 30 of beverage container coaster 10 that extend from an edge 41 of palm portion 42 may be permanently fixed in shape and position (i.e. immovable) with the finger tip 34 of such fixed position finger extensions 30 being at an elevated height that is greater than the beverage area 48 surface height. However, referring to FIGS. 5-6, embodiments of the present invention are also contemplated where some or all of finger extensions 30 that extending from an edge 41 of palm portion 42 are constructed so that they are moveable between a substantially horizontal straight and extended position 43 (e.g. for convenient stacking and storage of the beverage container coasters) into various elevated positions and forms (e.g. raised and/or partly curled towards the beverage area 48).

Figures 9, 10:
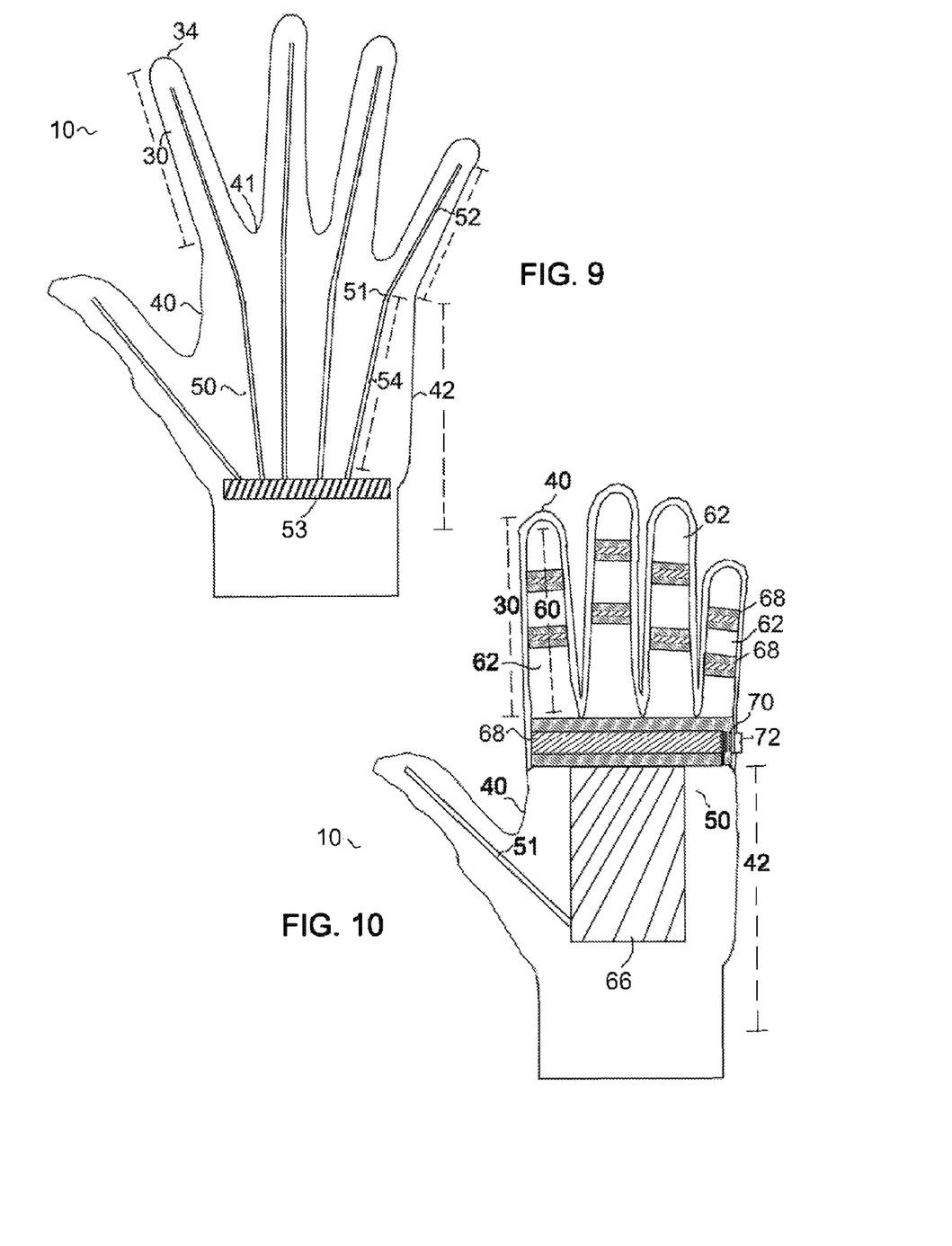
FIG. 9 is a top side sectional view of an embodiment of the beverage container coaster having a structural frame with moveable finger portions comprised of pliable wire.
FIG. 10 is a top side sectional view of an embodiment of the beverage container coaster having a structural frame with moveable finger portions comprised of rigid phalange sections rotatably attached to a metacarpal portion through a joint having a push button lock-release mechanism.

The ability to move and/or shape finger extensions 30 may be accomplished by providing an appropriate structural frame 50 that is integrated with (preferably interior to) coaster housing 40. Referring to FIG. 9, in one contemplated exemplary embodiment frame 50 is constructed such that it has a moveable finger portion 52 comprised of a wire 51, such as by way of example a manually pliable stainless steel wire. Moveable finger portion 52 is in connection with a metacarpal portion of frame 50. A moveable finger portion 52 may be considered to be in connection with metacarpal portion, by way of example and not limitation, in a contemplated embodiment where a single pliable wire 51 is used to connect with a portion of frame 50 that is a rigid support plate 53 secured within the palm portion of coaster housing 40: In such an embodiment the metacarpal portion of frame 50 comprises the portion of frame 50 located within the palm portion 42 of coaster housing 40, which in FIG. 9 is all individual wire portions 54 and the connected support plate 53. Wire portion 52 of wire 51 is the moveable finger portion that is integrated with finger extension 30 of coaster housing 40. In such a wire frame embodiment it is contemplated that the wire 51 to be used will be of a size and material that is manually pliable (i.e. bendable and capable of maintaining its bent shape) such that at least the distal end of finger portion 52 may be manually moved by a person into an elevated position, and can preferably be shaped manually by a person into various curved or articulated forms. Wire 51 may be any suitable pliable material including a metal or plastic. Examples of such manually pliable structural frames may be found in U.S. Pat. Nos. 3,624,691; 5,762,531; 5,800,242; 6,217,406, and the disclosures of all of these patents are incorporated herein by reference.

Referring to FIG. 10, in an alternative contemplated embodiment of structural frame 50, a moveable finger 60 within finger extension 30 of coaster housing 40 comprises at least one phalange section 62. Phalange section 62 may be comprised of any suitably rigid material, such as metal (e.g. aluminum), plastic (e.g. PVC), wood (e.g. pine), etc. . . . Each moveable finger 60 has a connection to a metacarpal portion 66 of the frame through a joint 68. Metacarpal portion 66 is contemplated to be a rigid support structure (e.g. a rigid plate or metal or plastic) that is secured within palm portion 42 of coaster housing 40.

In the contemplated embodiments joint 68 permits pivotal rotation of moveable finger 60 to and from an elevated position relative to metacarpal portion of frame 50 in much the same way as a metacarpophalangeal joint in a human hand facilitates the pivotal rotation of the phalange bone of a human finger relative to a metacarpal bone in the human palm. Examples of a mechanical joint 68 similar to a metacarpophalangeal joint that may be adapted for use in the present invention are described in U.S. Pat. Nos. 1,363,477; 3,899,796; 4,193,139, and the disclosures of these patents are hereby incorporated by reference.

As also shown in the embodiment of FIG. 10 it is contemplated that moveable finger 60 may be comprised of a plurality of phalange sections 62. In such an embodiment of moveable finger 60 it is contemplated that each phalange section 62 will be attached to an adjacent phalange section 62 by a joint 68 such that the different phalange sections 62 of moveable finger 60 may be rotated relative to one another to provide for articulated movement of moveable finger 60 allowing for the shaping of moveable finger 60 into various curved positions. It is contemplated that frictional forces present in the joints 68 will be sufficient, or adjustable, such that moveable finger 60 will be pliable in the sense of a person being able to manually move the phalange sections 62 about joints 68 to change the elevations and/or shapes of a moveable finger 60. It is contemplated that the size of individual joints 68 will vary based upon location in a moveable finger 60. It is further contemplated that each moveable finger 60 may be attached to metacarpal portion 66 with its own individual joint 68, or in the alternative (as shown in FIG. 10) a plurality of moveable fingers 60 may all be connected to metacarpal portion 66 of frame 50 through attachment to a single joint 68 that substantially traverses the palm portion 42 of beverage container coaster 10. As shown in FIG. 10 it is possible that frame 50 may be comprised of one or more moveable fingers comprised of a pliable wire 51, and also one or more moveable fingers 60 having rigid phalange sections 62 connected by joints 68.

It is contemplated that in some embodiments, such as is shown for example in FIG. 10 where a plurality of a moveable fingers 60 are attached to metacarpal portion 66 of frame 50 by a single joint 68, that there may be a lock-release mechanism 70 for the joint 68. Lock-release 70 is used to lock and/or release joint 68 such that moveable fingers 60 may be moved to and/or fixed at various positions (e.g. vertically or horizontally). It is contemplated that in some embodiments a lock-release mechanism may use a pressure release method such as the pressing of an area on coaster housing 40 that would release and/or engage a latch. In other contemplated exemplary embodiments a spring may be incorporated into lock-release 70 to provide a resisting force that must be manually overcome to position the moveable fingers 60 into a particular position (vertical or horizontal) and a mechanical locking cam or latch can be engaged to then prevent movement under a force from the spring. A push button mechanism 72 may be used to disengage the lock-release 70. Examples of lock-release mechanisms that may be adapted for use in the present invention are shown in U.S. Pat. Nos. 8,485,071; 7,698,821, and the disclosures of these patents are incorporated herein by reference.

It is further contemplated that in some "robotic" embodiments of the present invention that the movement and/or shape of moveable fingers 60 may be mechanically or motor driven. Examples of such a "robotic" implementation which may be adapted for use in the present invention are described in U.S. Pat. Nos. 5,378,033; 5,080,682; 7,361,197, and the disclosures of these patents are incorporated herein by reference.

Referring to FIGS. 1-8 it is contemplated that embodiments of the present invention that use a structural support frame 50, such as described herein with respect to examples illustrated in FIGS. 9-10, will have a coaster housing 40 that at least partly covers frame 50. Such a coaster housing 40 is contemplated to be comprised at least in part of a pliable material that can stretch and conform to the various elevated positions and shapes of moveable finger portions 60 of frame 50. An example of such a pliable material used for coaster housing 40 may include rubbers or plastics such as a flexible PVC. The material and outer surfaces of coaster housing 40 that covers frame 50 may be colored and/or also bear various images, patterns, designs, insignia, symbols, text, messages, slogans or logos. Upper outer surface 46 of coaster housing 40 covering a frame 50 contains a beverage area 48 in palm portion 42 for supporting a beverage container 20 in a substantially level fashion. The beverage area 48 of coaster housing 40 is preferably comprised of an appropriate material to prevent moisture or heat transfer between a beverage container 20 placed on beverage area 48 and any interior components of housing 40 or any surface upon which beverage container coaster 10 is resting or in contact with. Beverage area 48 may be comprised of a non-slip material to prevent movement of the beverage container 20 and possible spillage of the beverage. An example of materials that some or all of housing 40, including beverage area 48, may be comprised of include but are not limited to elastomers, plastic polymers (such as polyvinyl chloride (PVC)), rubber, or cork.

It is contemplated that in some embodiments of the present beverage container coaster invention that various light generators would be incorporated into the beverage container coaster 10. By way of example and not limitation, it is contemplated that one or more portions of coaster housing 40 may use a chemically luminescent material or coating that glows in the dark as a light generator. In an exemplary embodiment portion 42, finger extensions 30, and/or finger nails 80 at finger tips 34 may be coated with a glow in the dark coating such as Krylon® Glowz® glow in the dark paint, and/or may be comprised of a glow in the dark material such as for example a phosphorescent polymer composition as is described in U.S. Pat. No. 5,716,723 which is hereby incorporated by reference.

Figure 11:
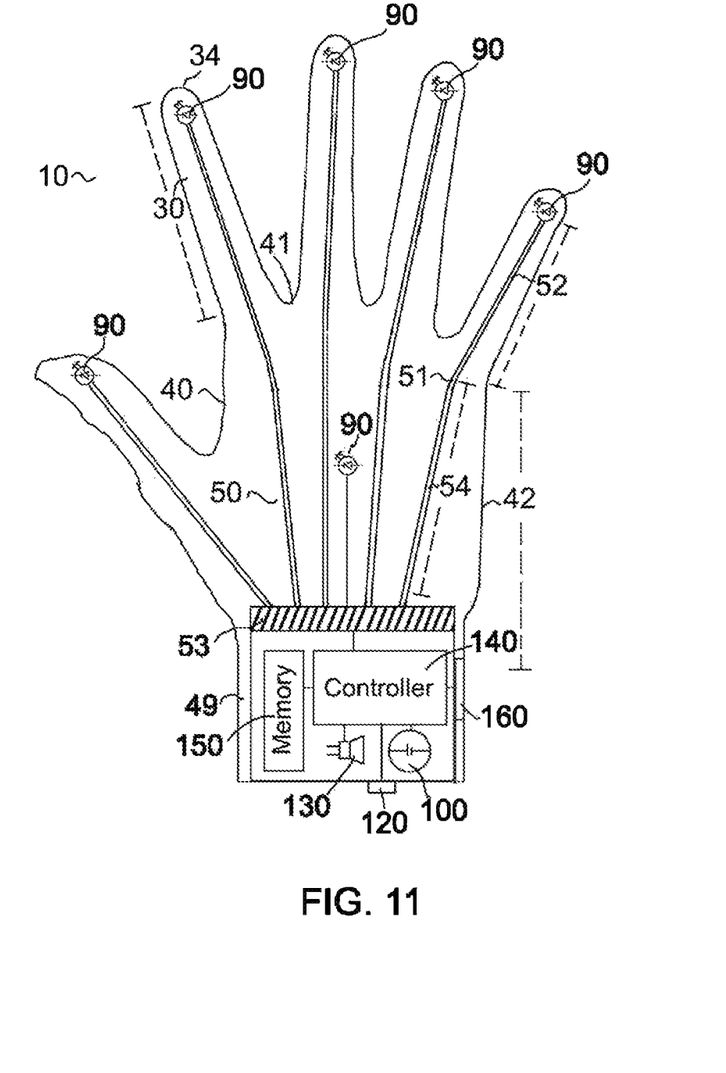
FIG. 11 is a top side sectional view of an embodiment of the beverage container coaster having a structural frame with pliable wire moveable finger portions, and that also integrates into the beverage container coaster housing a plurality of electric light generators and an electric sound source that are connected to a controller, associated memory, a communications port and a power source.

Referring to FIG. 11, in addition, or as an alternative, to the use of glow in the dark luminescent material or coatings, the beverage container coaster 10 may incorporate one or more electrically powered light generators 90 (e.g. light emitting diodes (LEDs), fluorescent or incandescent bulbs) into one or more parts of the beverage container coaster 10. By way of example electrical LEDs 90 could be incorporated into the palm portion 42 and/or finger tips 34 of beverage container coaster 10. In embodiments that do incorporate electrically powered light generators it is contemplated that such light generators would be contained within coaster housing 40, and that coaster housing 40 may have one or more surfaces that are translucent such that light emitted from an electric light generator within could pass through such translucent portions of coaster housing 40 and be observed. Thus by way of example beverage area 48 may be comprised of a translucent material that permits light from a light generator contained with coaster housing 40 in palm portion 42 to pass through upper outer surface 46 of coaster housing 40 at beverage area 48. Such light may illuminate a transparent beverage container (e.g. a drinking glass) from below. By way of further example optional finger nails 80 may be comprised of a translucent material that permits light from a light generator 90 contained within coaster housing 40 at or near finger tips 34 to pass through finger nails 80 to be observed.

Light generators themselves may emit light of a particular color. Alternatively, for electrically powered light generators, the translucent portions of coaster housing 40 may be colored to affect the color of transmitted light observed. It should be noted that so long as any light from a light generator contained within coaster housing 40 may be observed through a surface portion of coaster housing 40 that such surface portion would be considered to be translucent. It should further be noted that while preferred embodiments have electrically powered light generators contained within coaster housing 40, such light generators may also be integrated with beverage container coaster 10 on an outer surface of, embedded in, or simply attached to coaster housing 40 without departing from the present invention.

Figure 12:
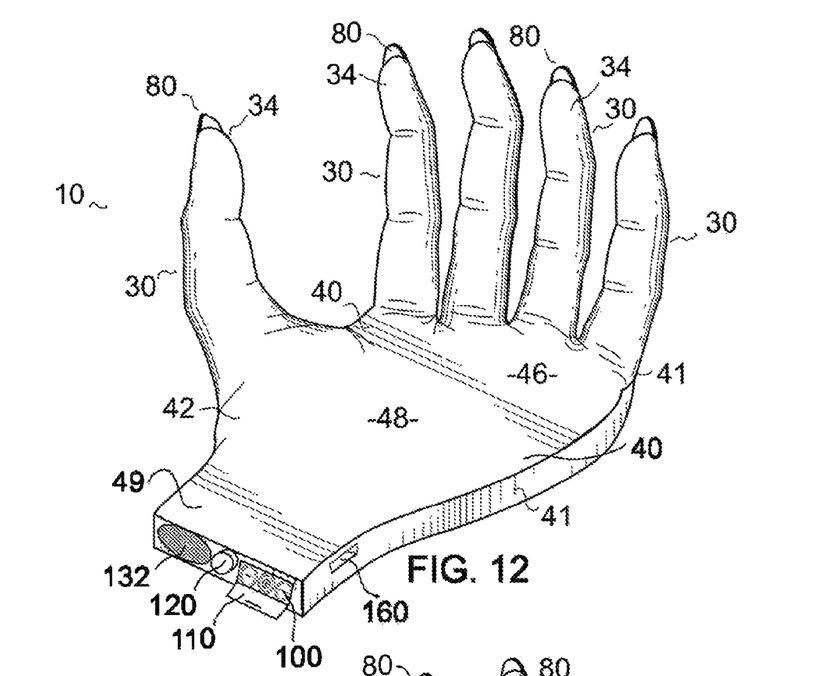
FIG. 12 is a right front side perspective view of an exemplary embodiment of the beverage container coaster having a power on/off button, an audio speaker, power source (battery) compartment, and communications port.
Figure 13:
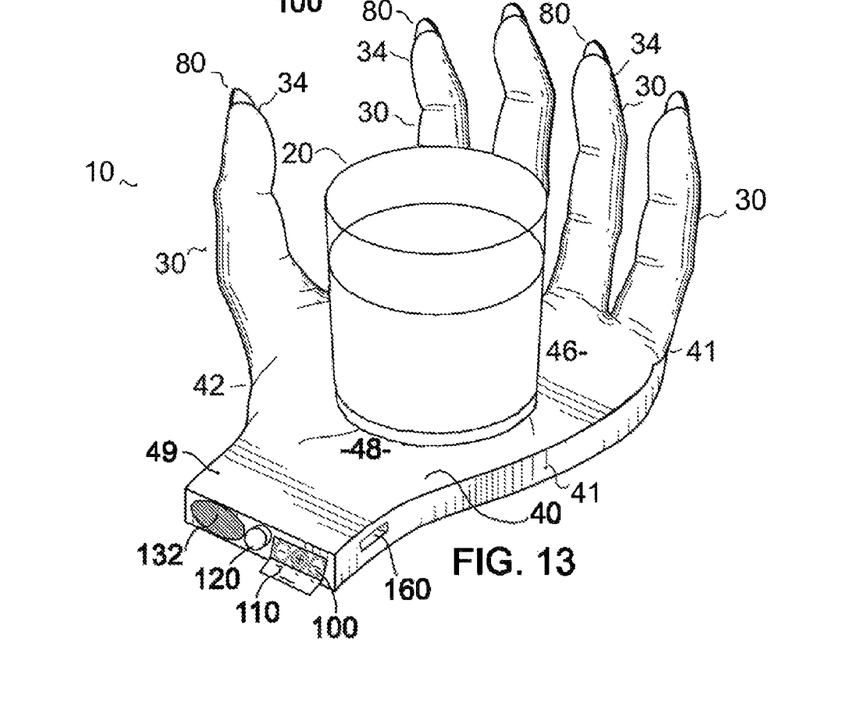
FIG. 13 is a right front side perspective view of the beverage container coaster shown in FIG. 12 supporting a beverage container on the beverage area of the palm portion.

Referring to FIGS. 11-13, electrically powered light generators may receive power from an electrical power source 100 that is contained within coaster housing 40. In an exemplary embodiment power source 100 may comprise batteries (e.g. rechargeable AAA batteries, coin batteries, etc. . . . ) that are contained in a compartment 110 located in a wrist portion 49 of beverage container coaster 10. However, in alternative embodiments power source 100 may be located in other portions of coaster housing 40, and/or comprise an AC power supply that connects to a standard 120V wall outlet. Push button switch 120 on wrist portion 49 is a power on/off switch that is used to electrically connect and disconnect a power source 100 from electrically powered components of beverage container coaster 10 such as light generators 90.

It is further contemplated that some embodiments of the present invention will also incorporate at least one sound generator 130 into beverage container coaster 10. Sound generator 130 may be contained within coaster housing 40 and is used to produce audibly perceptible sounds output by a speaker 132. Such sounds may include music, songs, spoken language, animal sounds, human sounds, monster sounds, tones, pitches, and/or any other audibly perceptible subject matter. An example of a sound generator that may be adapted for use in the present invention is described in U.S. Pat. No. 5,092,810 that is incorporated herein by reference.

It is contemplated that activation of power switch 120 may in an exemplary embodiment automatically trigger the production of an audible sound (e.g. a beverage container coaster 10 in the form of a zombie hand may generate an audible snarling sound when power switch 120 is pushed). It is further contemplated that in some embodiments the push button switch 72 used for controlling lock-release 70 may also serve to switch on (or off) electrical power in beverage container coaster 10 such that unlocking the lock release 70 from a certain position will provide power to sound and/or light generators which may result in an audible sound and/or light. Thus, by way of example, in such a contemplated embodiment using a lock-release 70 may simultaneously unlock a moveable finger 60 from a locked position, activate a sound generator 130 to transmit an auditory sound, and also activate one or more light generators 90 to transmit light. In such an embodiment locking the lock-release 70 for a moveable finger 60 (e.g. positioning a moveable finger 60 at a certain locked position) may deactivate and turn off lighting, auditory, or other electronic components.

In some embodiments it is contemplated that the electrically powered light and/or sound generators integrated with coaster housing 40 will be under the control of a controller 140 contained within coaster housing 40. Controller 140 may be a conventional microprocessor (e.g. an 8088, x86, IA-32, IA-64, or ARM architecture processor), a programmable interface controller (PIC), a digital logic device, or an application specific integrated circuit (ASIC). Controller 140 would be operatively connected with an associated memory 150 (e.g. RAM, ROM, EEPROM, flash memory) also contained within coaster housing 40 and that is used for storing operating instructions and data used by controller 140 for operating the light and/or sound generators integrated with coaster housing 40.

In some embodiments controller 140 and memory 150 may be connected to a computing device (e.g. personal computer, smart phone, etc. . . . ) through a communication port 160 (e.g. a USB, Firewire, Thunderbolt, or Ethernet port) that is integrated with coaster housing 40. Connection to a computing device may facilitate the programming and/or updating of instructions and data stored in memory 150 and/or controller 140. Thus for example memory 150 could store instructions used by the controller 140 to output certain lighting displays (e.g. strobe, blinking, synchronized patterns) of the light generators. Memory 150 could also store various data for sounds (e.g. musical tracks, sounds, messages, etc. . . . ) for controller 140 to output through sound generators. Such instructions and/or data may be updated or changed by a user connecting a computing device having an appropriate software application to controller 140 and memory 150 through communication port 160.

Referring to FIGS. 14-19 in one contemplated embodiment one or more fingers 300 of beverage container coaster 10 may be removably attachable to coaster housing 40. Fingers 300 may be individual fingers 310 that are removably attachable to coaster housing 40, or can be combined into a finger module 320 comprising multiple fingers 300 joined together and the finger module 320 being removably attachable as a unit to coaster housing 40.

Figure 14:
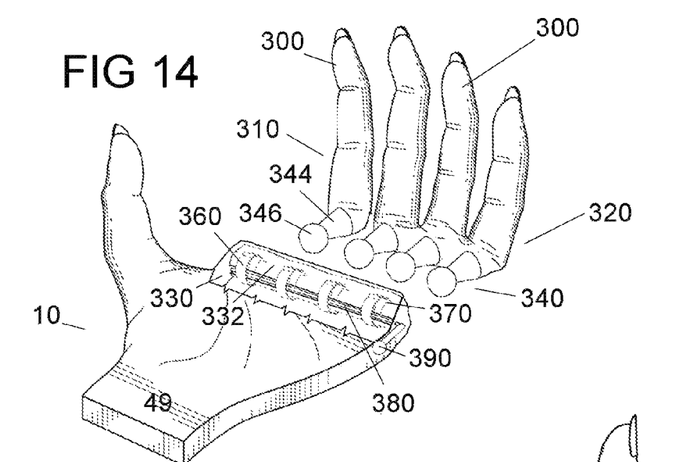
FIG. 14 is a right front side perspective view of a beverage container coaster with a removably attachable finger and a removably attachable finger module shown removed. from the coaster housing, with a cutaway view of the coaster housing attachment mechanism.

Referring to FIG. 14 In a contemplated embodiment coaster housing 40 comprises along at least one edge of palm portion 42 an attachment mechanism 330 for securing and releasing fingers 300 and/or finger modules 320 to and from respectively coaster housing 40. A preferred contemplated embodiment of attachment mechanism 330 has a configuration like the quick release socket connector described and illustrated in U.S. Pat. No. 7,124,864 (Jones et al) the full content of which is hereby incorporated by reference.

Attachment mechanism 330 is comprised of an attachment mechanism body 332, a rotatable cam 380, a control lever 390, at least one C-shaped locking spring 360 having a first locking spring end 362 and a second locking spring end 364, a slot 370 for each locking spring end, and a spherical socket 350 for each C-shaped locking spring 360. A removably attachable finger 310 comprises a finger 300 and ball assembly 340 at a proximal end of finger 300. Ball assembly 340 comprises a post 344 and a spherical ball 346. A removably attachable finger module 320 comprises a plurality of fingers 300 joined together at their distal ends and at least one ball assembly 340 at said joined proximal ends of fingers 300.

Figure 15:
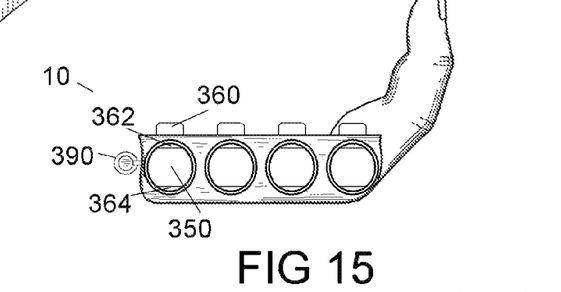
FIG. 15 is a rear side view of a beverage container coaster showing attachment openings in the coaster housing with the retaining C-rings in the retracted position for receiving into the attachment openings the attachment assemblies of removably attachable fingers and/or a removably attachable finger modules.
Figure 16:
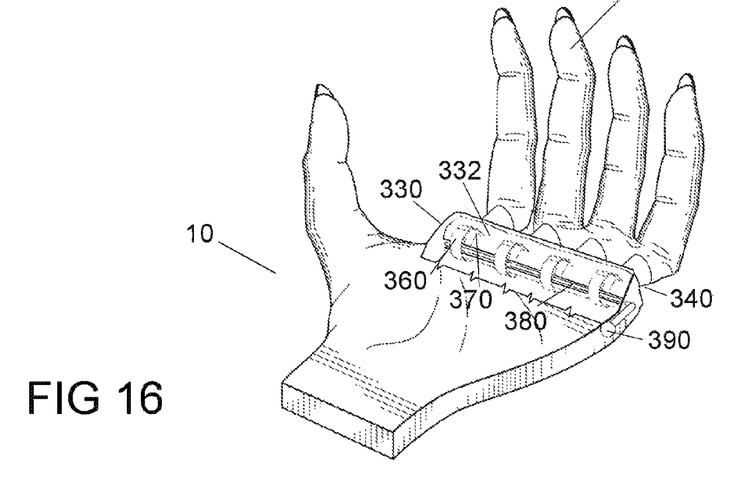
FIG. 16 is a right front side perspective view of a removably attachable finger and a removably attachable finger module shown being inserted into attachment openings of the coaster housing, with a cutaway view of the coaster housing attachment mechanism in a receiving position.
Figures 17, 18, 19:
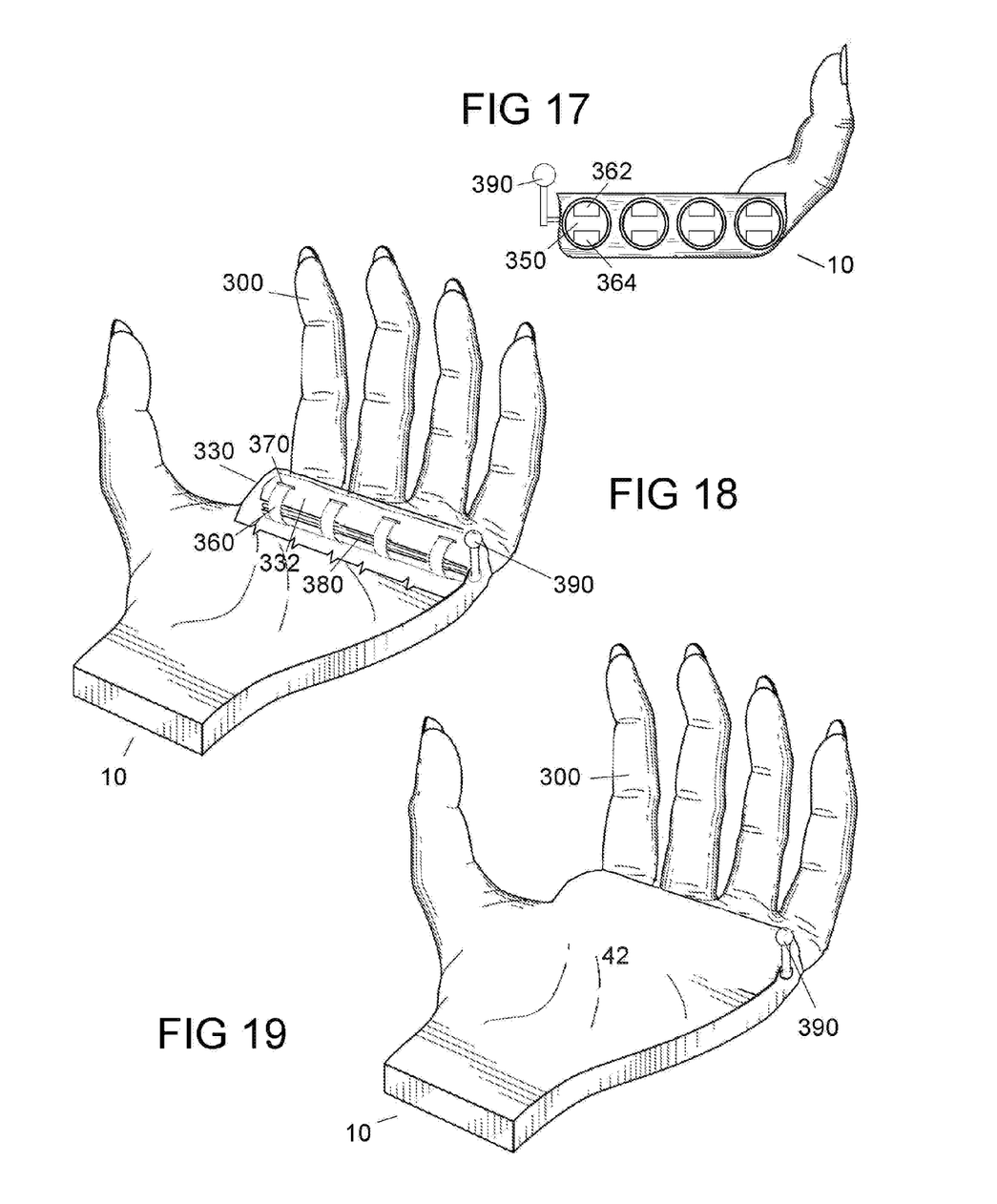
FIG. 17 is a rear side view of a beverage container coaster showing attachment openings in the coaster housing with the retaining C-rings in the extended position for securing in the attachment openings the attachment assemblies of removably attachable fingers and/or a removably attachable finger modules.
FIG. 18 is a right front side perspective view of a removably attachable finger and a removably attachable finger module attached to the coaster housing, with a cutaway view of the coaster housing attachment mechanism in a securing position.
FIG. 19 is a right front side perspective view of a removably attachable finger and a removably attachable finger module attached to the coaster housing.
Figure 20:
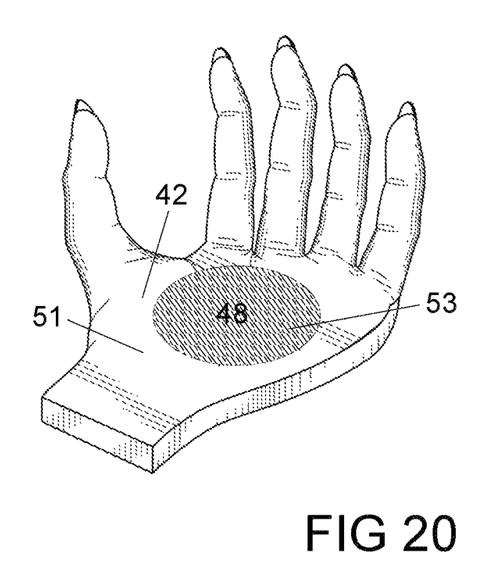
FIG. 20 is a right front side perspective view of a beverage container coaster with a horizontal beverage area that is comprised of a material that is different from the adjacent and surrounding material of the palm portion of the coaster housing.

When control lever 390 is rotated from a vertical position forwards towards the wrist portion 49 into a substantially horizontal position as shown in FIGS. 14-16 it causes attached cam 380 to rotate with it and this through one or more cam blades on cam 380 exerts a force against each locking spring 360 located along the length of cam 380. This force moves each locking spring 360 located along cam 380 from a locked position (as shown in FIGS. 17-18 where the ends of each locking spring 360 extend through slots 370 fully into a spherical socket 350) into an unlocked position (as shown in FIGS. 14-15 where each locking spring 360 is in an elevated position supported by cam 380 with the ends of each locking spring 360 being withdrawn at least partially from spherical slot 350 through slots 370).

Referring to FIG. 16, when a locking spring 360 is moved into an unlocked position such that the ends of locking spring 360 withdraw at least partially from spherical socket 350, this permits the ball assembly 340 (specifically at least spherical ball 346) of a finger 310 or finger module 320 to be placed into, or removed from, spherical socket 350. Referring to FIGS. 18-19, with spherical ball 346 placed in spherical socket 350 and locking spring 360 placed in a locked position the ends of locking spring 360 extend sufficiently into and over the opening of spherical socket 350 to prevent spherical ball 346 from being withdrawn out of spherical socket 350. Thus, the finger 310 or the finger module 320 that ball assembly 340 is attached to would be securely attached to coaster housing 40. The finger 310 or the finger module 320 could subsequently be removed from coaster housing 40 by using control lever 390 to move locking springs 360 into an unlocked position permitting the withdrawal of ball assembly 340 from spherical socket 350. Thus finger 310 and/or finger module 320 are removably attachable to coaster housing 40.

It is contemplated that the ball and socket connection established between a removably attachable finger 310 and/or a finger module 320 will facilitate finger 310 and/or finger module 320 being rotatably attached to coaster housing 40. The amount or ease of rotation of spherical ball 346 in spherical socket 350 may be determined in part by providing for a fixed or variable friction fit between spherical ball 346 and an interior surface of spherical socket 350.

It is further contemplated that one or more fingers 300 of finger 310 and/or finger module 320 may be pliable so that fingers 300 may be shaped into a desired position. This pliability may be facilitated by finger 300 comprising one or more segments of an interior pliable wire, and/or one or more joints between phalange sections.

It is further contemplated that a connection between coaster housing 40 and removably attachable finger 310 or removably attachable finger module 320 may include and electrical connection such that any electrical components in finger 310 and/or finger module 320 may receive power from a power supply associated with the coaster housing (e.g. internal batteries).

While particular embodiments of the present invention have been shown and described, it will be obvious to those skilled in the art that based upon the teachings herein, that changes and modifications may be made without departing from this invention and its broader aspects. Therefore, the appended claims are to encompass within their scope all such changes and modifications as are within the true spirit and scope of the invention.

The invention claimed is:

1. A beverage container coaster comprising:
 a coaster housing having a horizontal palm portion;
 said palm portion having a lower outer surface;
 said palm portion having an upper outer surface;
 said upper outer surface including a horizontal beverage area; and a finger extension removably attached to said coaster housing.

2. The beverage container coaster of claim 1 further comprising a generator incorporated into said coaster housing that is a light generator or a sound generator.

3. The beverage container coaster of claim 2 further comprising said light generator being a chemically luminescent light generator.

4. The beverage container coaster of claim 2 further comprising said light generator being an electrically powered light generator.

5. The beverage container coaster of claim 1 further comprising said coaster housing having a portion that is translucent.

6. The beverage container coaster of claim 2 further comprising an electrical power source that provides electric power to said generator and to a controller with associated memory.

7. The beverage container coaster of claim 6 further comprising a communication port connected to said controller and said associated memory.

8. The beverage container coaster of claim 1 wherein said removably attached finger extension is rotatably attached at a proximal end to said coaster housing.

9. The beverage container coaster of claim 1 wherein said removably attached finger is moveable.

10. The beverage container coaster of claim 9 further comprising said at least one removably attached moveable finger portion being comprised of a pliable wire.

11. The beverage container coaster of claim 9 further comprising said at least one removably attached moveable finger portion having a plurality of phalange sections located between a proximal end and a distal finger tip of said removably attached moveable finger portion, with each phalange section being rotatably attached to an adjacent phalange section by a joint.

12. The beverage container coaster of claim 9 further comprising a generator incorporated into said coaster housing that is a light generator or a sound generator.

13. The beverage container coaster of claim 12 further comprising said light generator being a chemically luminescent light generator.

14. The beverage container coaster of claim 12 further comprising said light generator being an electrically powered light generator.

15. The beverage container coaster of claim 9 further comprising said coaster housing having a portion that is translucent.

16. The beverage container coaster of claim 12 further comprising an electrical power source that provides electric power to said generator and to a controller with associated memory.

17. The beverage container coaster of claim 16 further comprising a communication port connected to said controller and said associated memory.

18. A beverage container coaster comprising:
a coaster housing having a horizontal palm portion;
said palm portion having a lower outer surface;
said palm portion having an upper outer surface that is comprised of a first area made of a first material and a horizontal beverage area that is made of a second material; and
said coaster housing further comprising at least one finger extension that extends from an edge of said palm portion.

19. A beverage container coaster comprising:
a coaster housing having a horizontal palm portion;
said palm portion having a lower outer surface and an upper outer surface;
a beverage area module receptacle in said horizontal palm portion;
a removable beverage area module; and
said coaster housing further comprising at least one finger extension that extends from an edge of said palm portion.

* * * * *